US005790361A

United States Patent [19]

Minich

[11] Patent Number: 5,790,361

[45] Date of Patent: Aug. 4, 1998

[54] COAXIAL SURGE PROTECTOR WITH IMPEDANCE MATCHING

[75] Inventor: Steven Eric Minich, Glen Rock, Pa.

[73] Assignee: The Whitaker Corporation, Wilmington, Del.

[21] Appl. No.: 826,867

[22] Filed: Apr. 11, 1997

Related U.S. Application Data

[60] Provisional application No. 60/042,217 Mar. 31, 1997.

[51] Int. Cl.$^6$ .......... H02H 3/22

[52] U.S. Cl. .......... 361/111; 361/107; 361/119

[58] Field of Search .......... 361/117–120, 124, 361/126, 127, 128, 129, 130, 111, 56, 91, 107; 333/206

[56] References Cited

U.S. PATENT DOCUMENTS

| | | | |
|---|---|---|---|
| 4,359,764 | 11/1982 | Block | 361/119 |
| 4,409,637 | 10/1983 | Block | 361/119 |
| 4,509,090 | 4/1985 | Kawanami | 361/119 |
| 4,633,359 | 12/1986 | Mickelson | 361/119 |
| 4,782,423 | 11/1988 | Takagi et al. | 361/127 |
| 4,862,311 | 8/1989 | Rust et al. | 361/91 |
| 5,394,466 | 2/1995 | Schneider | 379/399 |
| 5,566,056 | 10/1996 | Chaudhry | 361/117 |
| 5,657,196 | 8/1997 | Chaudhry et al. | 361/117 |

*Primary Examiner*—Jeffrey A. Gaffin
*Assistant Examiner*—Michael J. Sherry
*Attorney, Agent, or Firm*—Gerald K. Kita

[57] ABSTRACT

A surge protector (1) for a coaxial transmission line is constructed with a pair of coaxial connectors (2) mounted on a conducting hollow body (4), and a transmission line conductor (3) with a resilient beam portion (12) to engage and urge a surge protection element (5) against the hollow body (4).

6 Claims, 7 Drawing Sheets

Time Domain Reflectometry (TDR) Curve

COAXIAL SURGE PROTECTOR WITH IMPEDANCE MATCHING

This application claims the benefit of provisional application Ser. No. 60/042,217, filed Mar. 31, 1997.

FIELD OF THE INVENTION

The invention relates to surge protection for a coaxial transmission line, and more particularly, to a surge protector with impedance compensation and a method for providing a surge protector with impedance compensation.

BACKGROUND OF THE INVENTION

U.S. Pat. No. 4,633,359 discloses a known surge protector with an inner conductor comprising a transmission line conductor, and a concentric outer conductor, and a surge protection element, for example, a lightning arrester tube, extending from the outer conductor to the inner conductor. A surge protection element becomes conductive to shunt a voltage surge along the transmission line conductor.

In the known surge protector, the surge protection element registers in a reduced section of the inner conductor, to match the characteristic impedance of the surge protector. A separate spring urges the surge protection element against the outer conductor.

It is desirable to eliminate a separate spring and associated inventory, cost and assembly procedures. Further, for example, the separate spring contributes an undesired impedance change.

It is desirable to provide an internal transmission line conductor through a surge protector that is resilient to eliminate a separate spring.

It is desirable to compensate for impedance change in a coaxial transmission line due to standard coaxial connectors on a surge protector.

Further, it is desirable to provide a method of compensating for impedance change due to standard coaxial connectors on a surge protector.

SUMMARY OF THE INVENTION

The invention relates to a surge protector for a coaxial transmission line. A surge protector comprises, coaxial connectors connected to a transmission line conductor in a hollow body, and a beam portion of the transmission line conductor engaging and urging a surge protection element against the hollow body. The beam portion avoids a need for a separate spring and its contribution of an impedance mismatch.

Further, the invention relates to compensation for impedance change in a coaxial transmission line due to standard coaxial connectors on a surge protector.

According to an embodiment, a transmission line portion of a surge protector is at higher impedance to compensate for impedance change due to coaxial connectors on the surge protector.

Another aspect of the invention relates to a method of compensating for impedance change in a coaxial transmission line due to standard coaxial connectors on a surge protector.

DESCRIPTION OF THE DRAWINGS

The invention will now be described by way of example with reference to the accompanying drawings, according to which.

DETAILED DESCRIPTION

Figure 1:
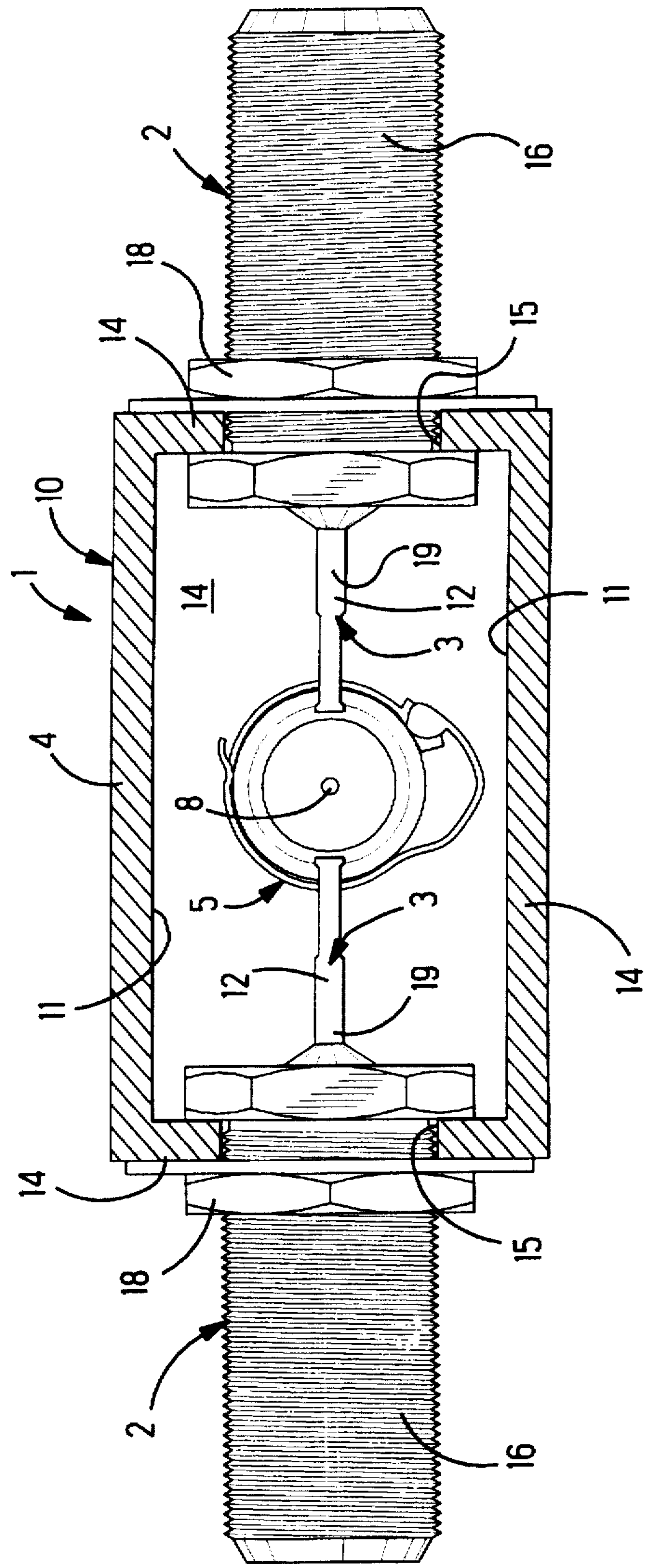
FIG. 1 is a top view of a surge protector with a top wall removed from a remainder of a hollow body.
Figure 6:
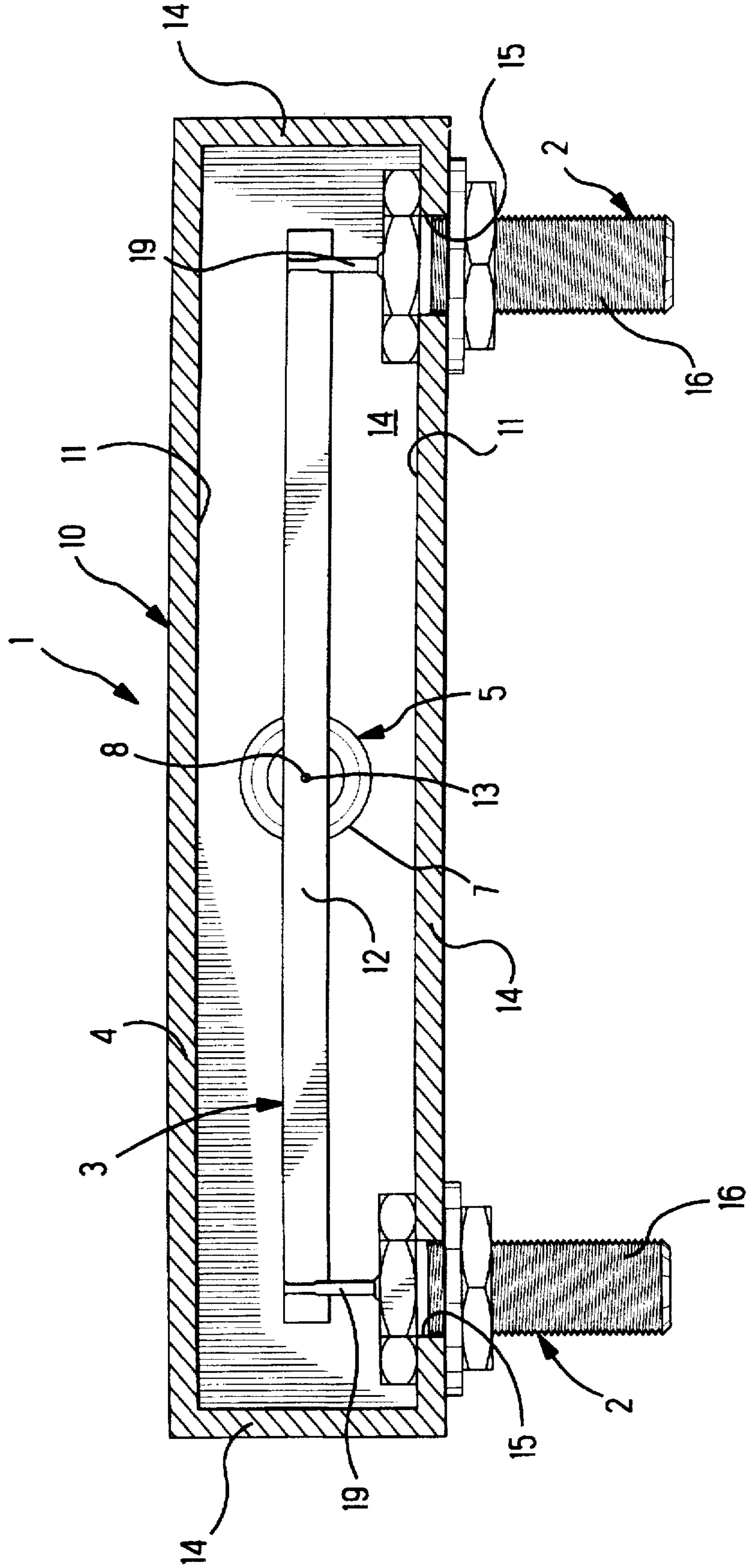
FIG. 6 is a view similar to FIG. 4, showing a surge protector with a top wall removed.

With reference to FIGS. 1 and 6, a surge protector 1 comprises, coaxial connectors 2 connected to a transmission line conductor generally shown at 3 in a conducting hollow body 4, and a resilient beam portion 12 of the transmission line conductor 3 engaging and urging a surge protection element 5 against the hollow body 4.

Figure 2:
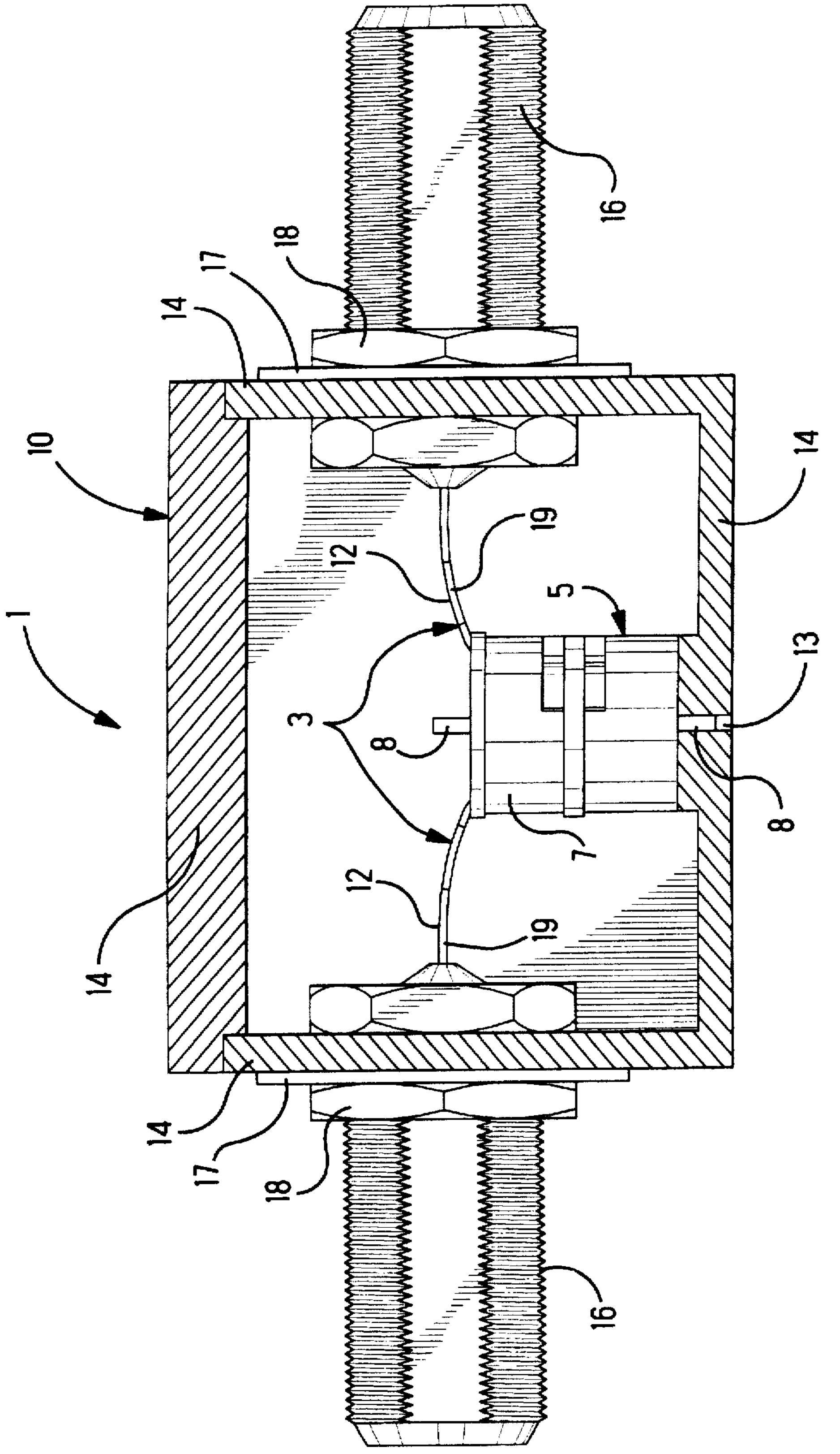
FIG. 2 is a side view in section of the surge protector shown in FIG. 1 with a top wall added.
Figure 3:
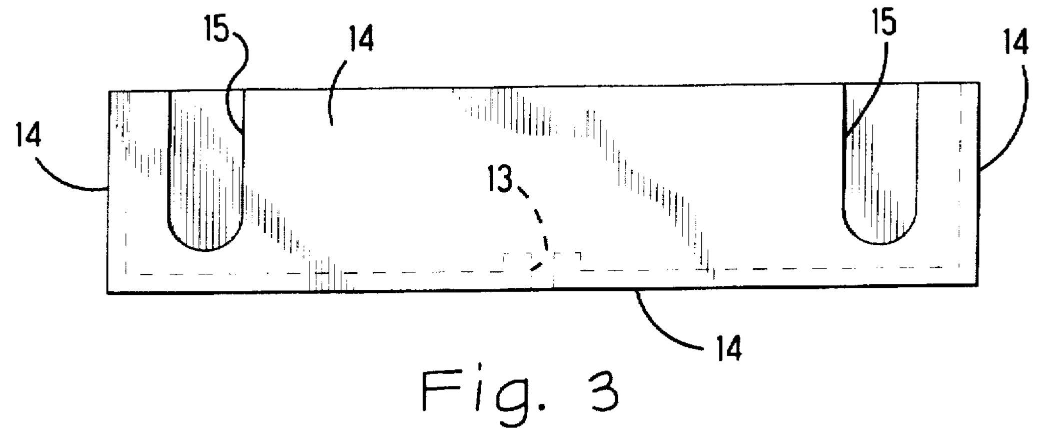
FIG. 3 is a side view of another embodiment of a hollow body.
Figure 4:
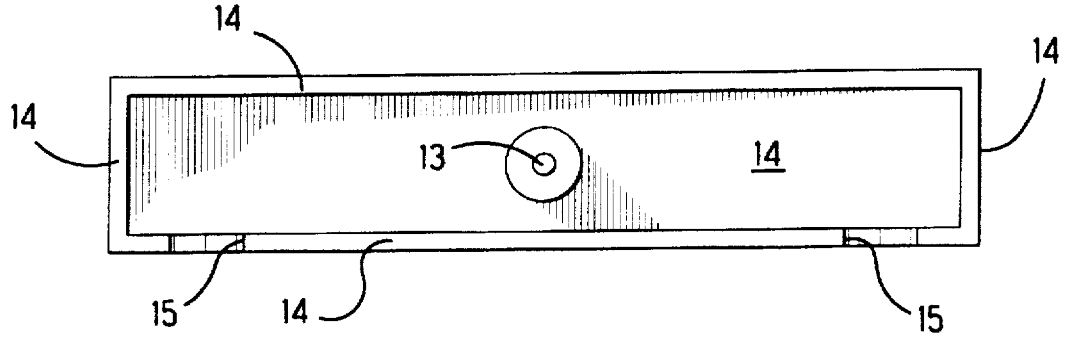
FIG. 4 is a top view of the hollow body shown in FIG. 3.
Figure 5:
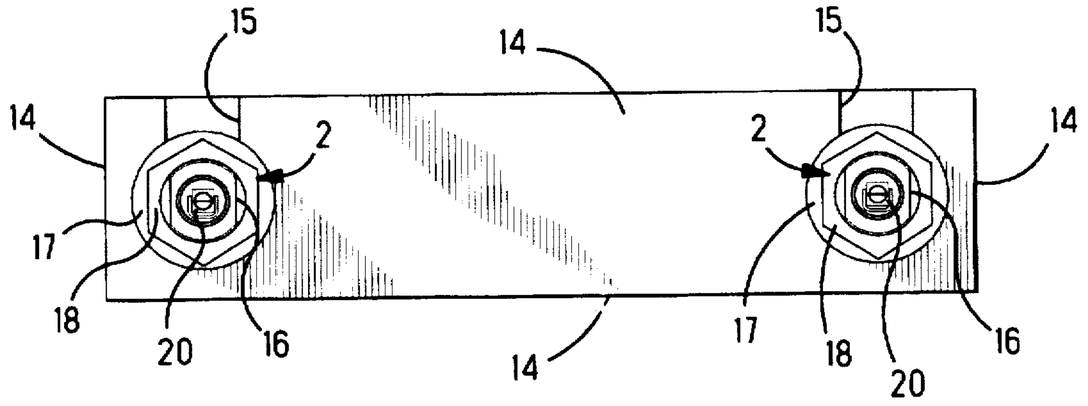
FIG. 5 is a view similar to FIG. 3 with each of two coaxial connectors mounted on a corresponding wall.

With reference to FIG. 2, the surge protection element 5 is a device that becomes immediately conductive to shunt a voltage surge. For example, a standard surge protection element 5 is commercially available, and comprises a cylindrical can 7 containing semiconducting material in series with two electrodes 8, FIG. 2. The electrodes 8 have respective electrical leads extending from respective conducting end caps.

The surge protector 1 is adapted to be coupled by the connectors 2 along a coaxial transmission line, not shown, of a given characteristic impedance, to provide surge protection, and without introducing an unwanted impedance change or impedance mismatch.

A transmission line portion 10 of the surge protector 1 comprises, the transmission line conductor 3 encircled by the hollow body 4. The coaxial connectors 2 are used to couple the transmission line portion 10 to a coaxial transmission line of given characteristic impedance. Each coaxial connector 2 causes an impedance change due to a lower impedance through each coaxial connector 2. A feature of the invention compensates for the impedance change. The transmission line portion 10 provides impedance compensation for the lower impedance through the coaxial connectors 2.

A separation distance 11 circumferentially separates the transmission line conductor 3 and an interior of the hollow body 4. According to a method of the present invention, later described, the separation distance 11 is varied to cause corresponding variations in the impedance of the transmission line portion 10 through the surge protector 1, until compensating for an impedance change due to a lower impedance through each corresponding coaxial connector 2. The hollow body 4 and the transmission line conductor 3 are noncylindrical in cross section. A matched impedance, coaxial transmission line is unnecessary. A concentric cylindrical construction for the transmission line 10 is unnecessary.

The transmission line conductor 3 comprises at least one conducting resilient beam portion 12 that urges the surge protection element 5 against the hollow body 4. The element 5 establishes electrical contact with the resilient beam portion 12 and the hollow body 4. A recess 13 through a bottom of one of the corresponding walls 14 that enclose the hollow body 4 receives a corresponding electrical lead of an electrode 8. In FIG., 6, a recess 13 is in the conductor. The electrode 8 is in electrical contact with the bottom of one of the corresponding walls 14. A solder joint improves the electrical contact. A separate spring is eliminated.

One form of known coaxial connector 2 is connected in U-shaped openings 15, FIGS. 1, 3, 5 and 6, in one of the corresponding walls 14 that enclose the hollow body 4. The known coaxial connector 2 comprises an externally threaded receptacle 16 at one end, a washer 17, a hexagonal threaded nut 18 that is threadably advanced and tightened against the washer 17, and a unitary solder tab 19 extending out from a conducting center contact 20, FIG. 5, of said coaxial connector 2. Such a coaxial connector 2 is commercially available. The solder tab 19 is used, for example, to connect with a circuit trace on a circuit board, not shown. According to an embodiment of the invention, the resilient beam portion 12 comprises the solder tab 19 to engage and urge the surge protection element 5 against the hollow body 4.

With reference to FIGS. 3–6, another embodiment of the invention will be described. The resilient beam portion 12, FIG. 6, connects solder tabs 19 of two coaxial connectors 2. Solder joints improve respective connection of the soldier tabs 19. The resilient beam portion 12 comprises a thin metal strip having a length that is chosen to space the coaxial connectors 2 a desired distance apart. The width of the strip can be selected with different dimensions, for example, by narrowing the width by successive trimming to narrower widths. Ends of the strip are attached, for example, by solder, to the solder tabs 19. According to this embodiment, two connectors 2 face in chosen directions. As shown, the chosen directions comprise the same direction. The two connectors 2 face in the same direction, and are along the same corresponding wall 14 of the hollow body 4. The beam portion 12 extends in an angular direction relative to each of the solder tabs 19 of corresponding coaxial connectors 2. The beam portion 12 spaces apart the coaxial connectors 2 by a chosen distance. The surge protector 1 can be fabricated to fit in a gap in a coaxial transmission line, not shown. The gap may vary to require the coaxial connectors 2 to be spaced apart a chosen distance to couple across the gap. The connectors 2 may need to face in chosen directions to couple across the gap.

According to each embodiment, the surge protection element 5 is positioned midway along the transmission line portion 3. The resilient beam portion 12 is evenly divided. The spring force exerted by the resilient beam portion 12 is evenly divided. For example, with reference to FIG. 1, spring stresses on the solder tabs 19 of the coaxial connectors 2 are equally divided. For example, the spring stress on the resilient beam portion 12, FIG. 6, is equally divided. The electrical shunt path is evenly divided in length from each coaxial connector 2 through the surge protection element 5.

Figure 7:
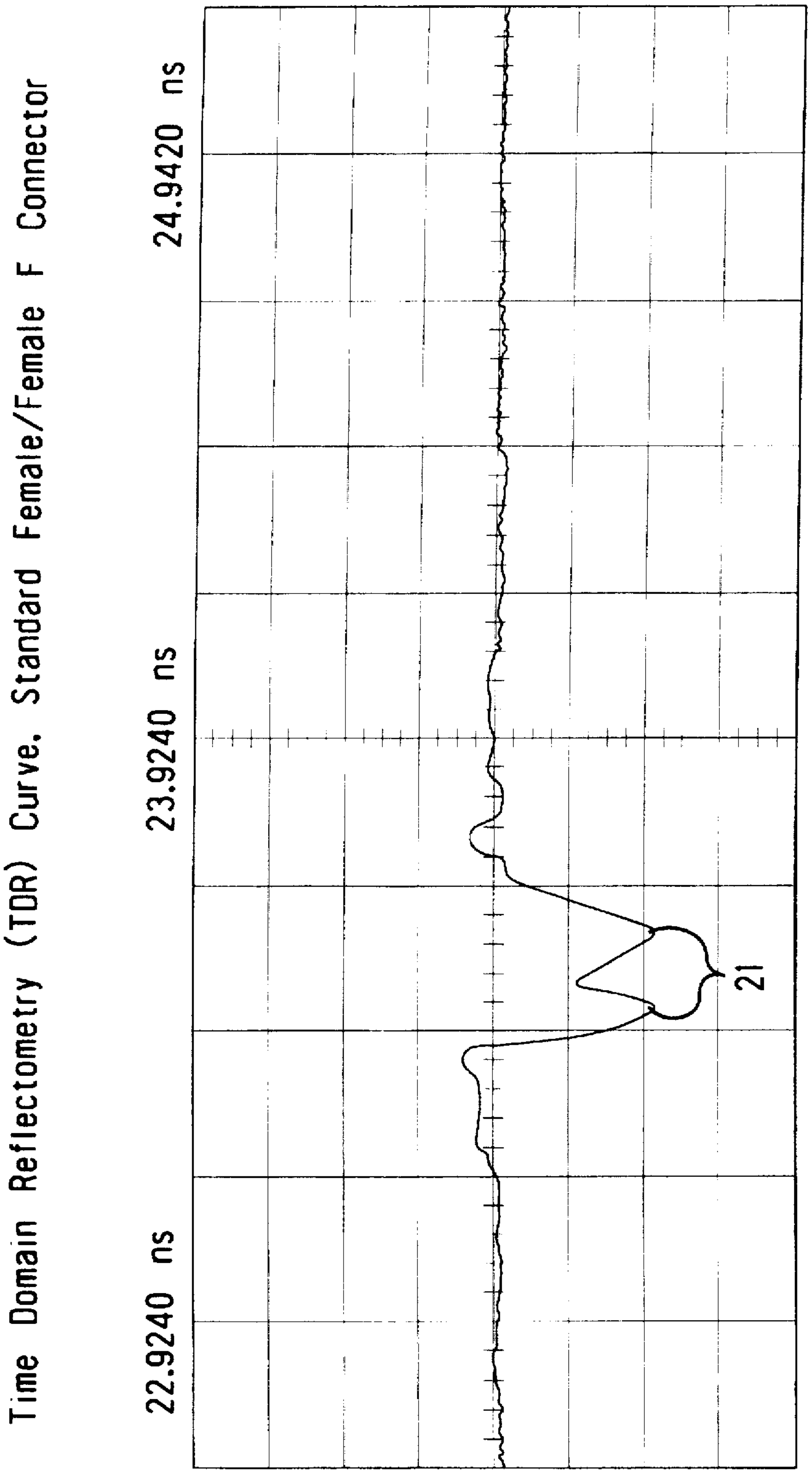
FIG. 7 is a graph of a Time Domain Reflectometry, TDR, curve.
Figure 8:
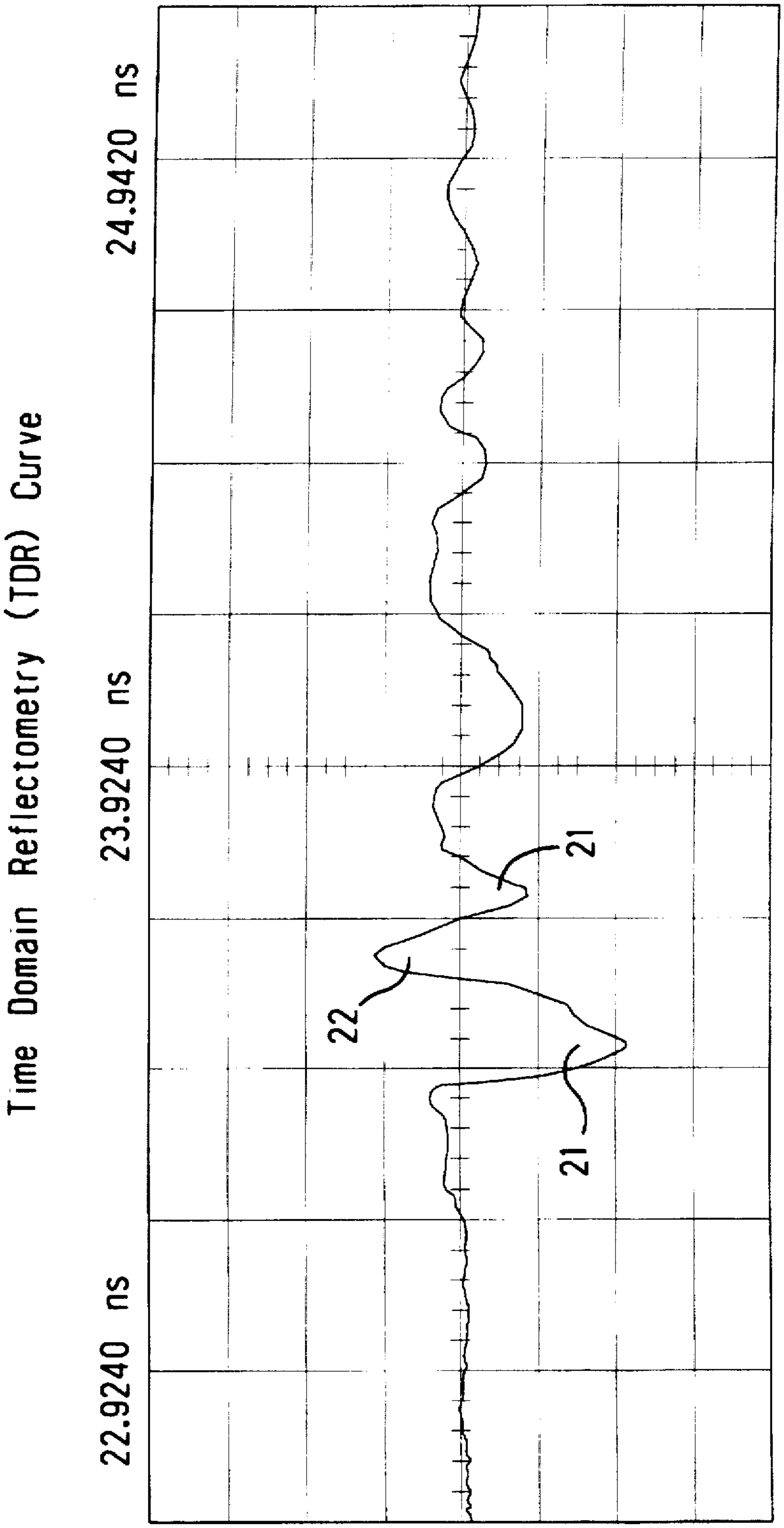
FIG. 8 is a graph of a TDR curve for the surge protector shown in FIG. 1.
Figure 9:
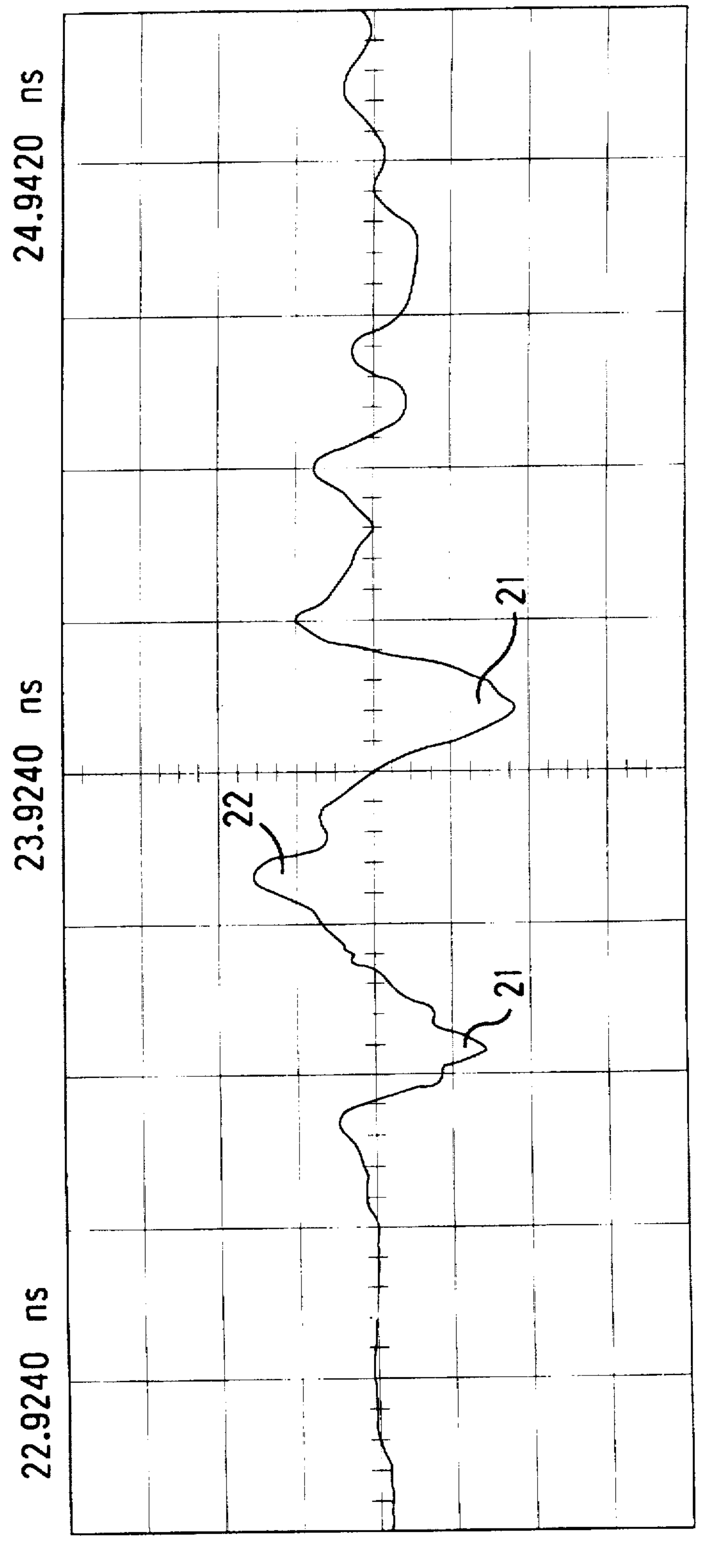
FIG. 9 is a graph of a TDR curve for the surge protector shown in FIG. 6.

Coupling the corresponding connectors 2 in a coaxial transmission line, not shown, results in an impedance change, due to lower impedance through the corresponding coaxial connectors 2. With reference to FIGS. 8 and 9, a graph of a TDR curve depicts a lower impedance at 21 through the corresponding coaxial connectors 2. Thus, coupling of the corresponding conductors 2 in a coaxial transmission line, not shown, results in an impedance change. Because the two coaxial connectors 2 are closely spaced, the impedance change is at one location on the curve, FIG. 7. By spacing the coaxial connectors 2 farther apart, FIG. 6, the corresponding TDR curve, FIG. 9, will show two locations of lower impedance at 21. With reference to FIG. 6, a graph of a TDR curve depicts the impedance change through corresponding coaxial connectors 2 at spaced locations. The corresponding impedance change on the curve is divided between two corresponding spaced locations.

The invention compensates for a change in impedance introduced by each known corresponding coaxial connector 2. Impedance compensation enables the use of a known coaxial connector 2 in the surge protector 1.

A method will now be described, according to which, compensation for impedance change is attained. An air gap defines the separation distance 11 circumferentially between the resilient beam portion 12 and an the hollow body 4. The separation distance 11 is selected with dimensions to provide a higher impedance through the transmission line 10 that compensates for a lower impedance through the corresponding coaxial connectors 2 on the surge protector 1.

The walls 14 of the hollow body 4 shown in the Figs., will be described as being moveable for the purpose of describing the method, although after completion of the method, the hollow body 4 of the surge protector 1 is intended to comprise fixed walls 14. According to a method of the present invention, the hollow body, FIG. 1, is first built as a model having movable walls 14 alongside the transmission line conductor 3. The movable walls 14 of the hollow body 4 are moved inward in steps to vary the separation distance 11. A known return loss test is relied upon to optimize the impedance through the surge protector 1. Return loss measurements and corresponding TDR readings are observed at various separation distances. A higher impedance through the transmission line 10 is shown at 22. When a wall position results in a corresponding TDR curve, similar to FIG. 8, the walls 14 are separated by a separation distance 11 from the transmission line conductor 3 that results in compensation for an impedance change by the lower impedance through each corresponding connector 2. The corresponding separation distance 11 is measured and then selected to fabricate duplicates of the hollow body 4 with fixed walls 14, as shown in FIG. 1.

A method for determining the dimensions of the surge protector 1 will now be described. A method comprises a step of, selecting a desired distance separating the coaxial connectors 2. For example, the coaxial connectors 2 can be relatively closely spaced, as in FIG. 1, to provide a compact surge protector 1. For example, the coaxial connectors 2 may need to be spaced apart at a distance determined by a gap in the coaxial transmission line. The surge protector 1 can be lengthened to couple across such a gap. The method comprises further steps of; mounting each of the coaxial connectors 2 on a corresponding wall 14; urging the element 5 against a corresponding wall 14 by the corresponding resilient beam portion 12; varying a separation distance 11 between the resilient beam portion 12 and corresponding walls 14 of the hollow body 4, for example, by moving the corresponding walls 14 to various separation distances 11 from the resilient beam portion 12, to vary the impedance through the transmission line portion 10; measuring the dimensions of the separation distance 11 that results in a desired impedance compensation; and using the dimensions to construct a hollow body 4 with a selected separation distance 11 providing impedance compensation for the lower impedance through the each of the corresponding coaxial connectors 2 mounted to the hollow body 2 at the desired distance separating the coaxial connectors 2.

A method will now be described, according to which, compensation for impedance change is attained, with reference to FIGS. 6 and 9. The walls 14 of the surge protector 1 are assumed to be stationary for the purpose of describing the method. A method for determining the dimensions of the surge protector 1 with reference to FIGS. 6 and 9 will now be described. The walls 14 of the surge protector 1 are assumed to be stationary for the purpose of describing the method. A method comprises steps of; selecting a desired distance separating the coaxial connectors 2; mounting each of the coaxial connectors 2 to a corresponding wall 14; urging the element 5 against a corresponding wall 14 by the corresponding resilient beam portion 12; varying a separation distance 11 between the hollow body 4 and the resilient beam portion 12, for example, by changing the width of the resilient beam portion 12 to different dimensions, to vary the impedance through the transmission line portion 10; measuring the dimensions of the separation distance 11, for example, by measuring the dimensions of the resilient beam 12 that results in a desired impedance compensation; and using the dimensions to construct a hollow body 4 and a resilient beam portion 12 with a selected separation distance 11 providing impedance compensation for the lower impedance through each of the corresponding coaxial connectors 2 mounted to the hollow body 4 at the desired distance separating the coaxial connectors 2.

Because the invention compensates for lower impedance through a known coaxial connector 2, the invention adapts the use of a commercially available known coaxial connector 2 in a surge protector 1 for a coaxial transmission line.

Impedance compensation is obtained without a uniformly concentric separation distance 11 between the transmission line portion 10 and the hollow body 4. The hollow body 4 can be noncylindrical. The resilient beam portion 12 can be nonuniform in cross section. For example, the solder tabs 19 of coaxial connectors 2 are often nonuniform in cross section. The hollow body 4 can have opposite walls 14 that are positioned at a selected separation distance 11 from the resilient beam portion 12, which results in the desired impedance compensation.

The invention is intended to comprise other embodiments and modifications covered by the claims.

What is claimed is:

1. A method of providing a surge protector for insertion in a coaxial transmission line of characteristic impedance, comprising the steps of:

mounting a surge protection element and a pair of corresponding coaxial connectors on a conducting hollow body, with the corresponding coaxial connectors being mounted on the body at a fixed distance apart for coupling to a coaxial transmission line, and with the coaxial connectors having corresponding solder tabs extending from corresponding conducting center contacts of the coaxial connectors, engaging the surge protection element with the corresponding solder tabs to urge the surge protection element in contact with the hollow body, and selecting a separation distance laterally between the corresponding solder tabs and the hollow body to compensate for a change in characteristic impedance introduced by each of the coaxial connectors.

2. A method of providing a surge protector for insertion in a coaxial transmission line of characteristic impedance, comprising the steps of:

mounting a surge protection element and a pair of corresponding coaxial connectors on a conducting hollow body, with the corresponding coaxial connectors being mounted on the body at a fixed distance apart for coupling to a coaxial transmission line, and with the coaxial connectors having corresponding solder tabs extending from corresponding conducting center contacts of the coaxial connectors, connecting a conducting beam portion to the corresponding solder tabs and engaging the surge protection element with the conducting beam portion extending from the corresponding coaxial connectors to urge the surge protection element in contact with the hollow body.

3. A method as recited in claim 2, and further comprising the step of: facing said coaxial connectors in the same direction.

4. A method as recited in claim 2, and further comprising the step of: selecting the separation distance laterally between the beam portion and the hollow body to provide a transmission line compensating for lower impedance through the coaxial connectors.

5. A method as recited in claim 4 wherein, the step of selecting a separation distance laterally between the beam portion and the hollow body, further comprises the step of: changing the width of the beam portion to provide a selected separation distance.

6. A method as recited in claim 4, and further comprising the step of: moving opposite walls of the hollow body transversely toward the beam portion to obtain compensation for a lower impedance through the coaxial connectors.

* * * * *